US011934295B2

(12) United States Patent
Haldeman et al.

(10) Patent No.: US 11,934,295 B2
(45) Date of Patent: Mar. 19, 2024

(54) DEBUG TRACE STREAMS FOR CORE SYNCHRONIZATION (71) Applicant: THE BOEING COMPANY, Chicago, IL (US)

(72) Inventors: David P. Haldeman, Sackets Harbor, NY (US); Eric J. Miller, Los Angeles, CA (US)

(73) Assignee: THE BOEING COMPANY, Arlington, VA (US)

( * ) Notice: Subject to any disclaimer, the term of this patent is extended or adjusted under 35 U.S.C. 154(b) by 6 days.

(21) Appl. No.: 17/522,407

(22) Filed: Nov. 9, 2021

(65) Prior Publication Data
US 2022/0171694 A1 Jun. 2, 2022

Related U.S. Application Data (60) Provisional application No. 63/120,614, filed on Dec. 2, 2020.

(51) Int. Cl.
G06F 11/36 (2006.01)
G06F 9/30 (2018.01)
G06F 9/4401 (2018.01)

(52) U.S. Cl.
CPC ...... *G06F 11/3636* (2013.01); *G06F 9/30098* (2013.01); *G06F 9/4405* (2013.01); *G06F 9/4418* (2013.01)

(58) Field of Classification Search
CPC .................................................. G06F 11/362
See application file for complete search history.

(56) References Cited

U.S. PATENT DOCUMENTS

| 6,343,358 | B1* | 1/2002 | Jaggar ............ G01R 31/318566 712/34 |
| 6,615,366 | B1* | 9/2003 | Grochowski ......... G06F 9/3836 712/E9.035 |
| 8,161,482 | B1* | 4/2012 | Sakarda ................ G06F 9/5027 718/104 |
| 10,754,760 | B1* | 8/2020 | Levy .................... G06F 11/3636 |
| 2001/0056571 | A1* | 12/2001 | Pennello ............. G06F 11/3636 717/124 |

(Continued)

FOREIGN PATENT DOCUMENTS

WO 9850856 A1 11/1998
WO 2007005818 A2 1/2007

OTHER PUBLICATIONS

European Patent Office, Extended European Search Report for Application 21206220.2-1203 dated Apr. 29, 2022.

(Continued)

*Primary Examiner* — Jae U Jeon
(74) *Attorney, Agent, or Firm* — Patterson + Sheridan, LLP (57) ABSTRACT The present disclosure provides for synchronization of multi-core systems by monitoring a plurality of debug trace data streams for a redundantly operating system including a corresponding plurality of cores performing a task in parallel; in response to detecting a state difference on one debug trace data stream of the plurality of debug trace data streams relative to other debug trace data streams of the plurality of debug trace data streams: marking a given core associated with the one debug trace data stream as an affected core; and restarting the affected core.

20 Claims, 6 Drawing Sheets (56) References Cited

U.S. PATENT DOCUMENTS

| | | | | |
|---|---|---|---|---|
| 2003/0005380 | A1* | 1/2003 | Nguyen | G06F 11/273 714/E11.17 |
| 2003/0061544 | A1* | 3/2003 | Maier | G06F 11/3636 714/39 |
| 2004/0199813 | A1 | 10/2004 | Hillman et al. | |
| 2005/0141503 | A1* | 6/2005 | Welfeld | H04L 45/00 370/392 |
| 2008/0115011 | A1* | 5/2008 | Codrescu | G06F 11/3656 726/22 |
| 2009/0249302 | A1* | 10/2009 | Xu | G06F 11/3636 717/128 |
| 2011/0199899 | A1* | 8/2011 | Lemaire | H04L 47/2416 370/230.1 |
| 2012/0074785 | A1* | 3/2012 | Fichtlscherer | G05B 19/0428 307/63 |
| 2013/0100993 | A1* | 4/2013 | Ripley | H03G 3/3036 326/63 |
| 2013/0268747 | A1* | 10/2013 | Chang | G06F 9/4405 713/2 |
| 2014/0258684 | A1* | 9/2014 | Hastie | G06F 9/3005 712/216 |
| 2015/0033357 | A1* | 1/2015 | Habel | G06F 21/44 726/26 |
| 2015/0304177 | A1* | 10/2015 | Greathouse | H04L 41/5009 709/224 |
| 2017/0064309 | A1* | 3/2017 | Sethuraman | H04N 19/159 |
| 2018/0253370 | A1* | 9/2018 | Merten | G06F 11/3037 |

OTHER PUBLICATIONS

Fardin Abdi et al.: "Restart-Based Security Mechanisms for Safety-Critical Embedded Systems," ARXIV.org, Cornell University Library, 201 Olin Library Cornell University Ithaca, NY 14853, Dated May 3, 2017, pp. 1-12.

* cited by examiner

DEBUG TRACE STREAMS FOR CORE SYNCHRONIZATION

CROSS-REFERENCE TO RELATED APPLICATIONS

This application claims benefit of and priority to U.S. Provisional Patent Application Ser. No. 63/120,614 filed Dec. 2, 2020, which is hereby incorporated by reference in its entirety.

FIELD

The present disclosure generally relates to computing systems using multiple processing cores in parallel. More particularly, the present disclosure relates to the detection and handling of desynchronization between the multiple cores via debugging tools, including trace cells, to verify whether various cores are in lockstep with one another and to take remedial action when the cores are out of lockstep.

BACKGROUND

Various systems use multiple processors to process instructions in parallel to one another to provide additional certainty and resiliency to the systems. For example, spacecraft, aircraft, and other devices that are used in ionizing environments are subject to environmental conditions that can cause Single Event Upsets (SEUs). These devices often use Triple Mode Redundancy (TMR) in their computing systems so that three processors perform the same tasks in parallel. A system using TMR uses the majority decision (i.e., where at least two of the three processors produce the same result) as an output. In the event that total consensus is not reached (i.e., where at least one of the three processors produced a unique result), the system using TMR resynchronizes the processor that disagreed or resets all three of the processors to ensure that the next calculation is performed with the full set of processors. The reset process reduces system availability, potentially at critical times, and the inclusion of multiple processors, as well as overhead of the TMR voting logic throughout the processing system, adds complexity and size to the system.

SUMMARY

The present disclosure provides a method in one aspect, the method including: monitoring a plurality of debug trace data streams for a redundantly operating system including a corresponding plurality of cores performing a task in parallel; in response to detecting a state difference on one debug trace data stream of the plurality of debug trace data streams relative to other debug trace data streams of the plurality of debug trace data streams: marking a given core associated with the one debug trace data stream as an affected core; and restarting the affected core.

In one aspect, in combination with any example method above or below, the corresponding plurality of cores consists of two active cores, including the affected core and a second core, the method further comprising, in response to detecting the state difference: marking the second core as a second affected core; and resetting the second core simultaneously with the affected core.

In one aspect, in combination with any example method above or below, the corresponding plurality of cores consists of three active cores, including the affected core, a first unaffected core, and a second unaffected core, the method further comprising, in response to detecting the state difference: stopping the affected core; and monitoring the first unaffected core and the second unaffected core perform the task in parallel in a consensus redundancy mode; and wherein restarting the affected core includes, in response to detecting a safe restart time: loading the affected core with register data from the first unaffected core; and reinitializing the affected core.

In one aspect, in combination with any example method above or below, the corresponding plurality of cores includes more than three active cores, including the affected core, a first unaffected core, a second unaffected core, and a third unaffected core, in response to detecting the state difference: stopping the affected core; and monitoring the first unaffected core, the second unaffected core, and the third unaffected core perform the task in parallel in a majority mode; and wherein restarting the affected core includes, in response to detecting a safe restart time: reloading the affected core with register data from the first unaffected core; and reinitializing the affected core.

In one aspect, in combination with any example method above or below, the corresponding plurality of cores are included on a shared System on a Chip with a supervisor, wherein the supervisor is one of: a radiation hardened processor; a hardware-defined state machine; and a maintenance processor.

In one aspect, in combination with any example method above or below, at least one core of the corresponding plurality of cores is included on a separate integrated circuit from other cores of the corresponding plurality of cores.

The present disclosure provides a system in one aspect, the system including: a plurality of cores configured to perform, in parallel, a corresponding plurality of instances of a task; and a supervisor configured to: receive debug trace data streams from the plurality of cores; and identify an affected core of the plurality of cores based on a state difference between the debug trace data streams associated with the affected core and other cores of the plurality of cores.

In one aspect, in combination with any example system above or below, the plurality of cores and the supervisor are disposed on a single integrated circuit.

In one aspect, in combination with any example system above or below, the supervisor is disposed on a first integrated circuit and at least one core of the plurality of cores is disposed on a second integrated circuit.

In one aspect, in combination with any example system above or below, the supervisor is further configured to: remove the affected core from the plurality of cores performing the task until a safe restart time; and in response to reaching the safe restart time, restart the affected core.

In one aspect, in combination with any example system above or below, when the plurality of cores includes at least two cores after removing the affected core, the supervisor is further configured to: reload affected registers associated with the affected core with data from unaffected registers associated with one unaffected core of the at least two cores; reinitialize the affected core; and return the affected core to the plurality of cores.

In one aspect, in combination with any example system above or below, the safe restart time is determined based on a safety profile of a device controlled by the system.

In one aspect, in combination with any example system above or below, when the plurality of cores consists of two cores, the supervisor is further configured to: reset a second core simultaneously with the affected core.

In one aspect, in combination with any example system above or below, the debug trace data streams are received via at least one of: instruction trace; data trace; and system trace.

The present disclosure provides a computer readable storage device in one aspect, the computer readable storage device including instructions that when executed by a processor perform an operation comprising: monitoring a plurality of debug trace data streams for a redundantly operating system including a corresponding plurality of cores performing a task in parallel; in response to detecting a state difference on one debug trace data stream of the plurality of debug trace data streams relative to other debug trace data stream of the plurality of debug trace data streams: marking a core associated with the one debug trace data stream as an affected core; and restarting the affected core.

In one aspect, in combination with any example computer readable storage device above or below, the corresponding plurality of cores consists of two active cores, including the affected core and a second core, the operation further comprising, in response to detecting the state difference: marking the second core as a second affected core; and resetting the second core simultaneously with the affected core.

In one aspect, in combination with any example computer readable storage device above or below, the corresponding plurality of cores consists of three active cores, including the affected core, a first unaffected core, and a second unaffected core, the operation further comprising, in response to detecting the state difference: stopping the affected core; and monitoring the first unaffected core and the second unaffected core perform the task in parallel in a consensus redundancy mode; and wherein restarting the affected core includes, in response to detecting a safe restart time: loading the affected core with register data from the first unaffected core; and reinitializing the affected core.

In one aspect, in combination with any example computer readable storage device above or below, the corresponding plurality of cores includes more than three active cores, including the affected core, a first unaffected core, a second unaffected core, and a third unaffected core, the operation further comprising, in response to detecting the state difference: stopping the affected core; and monitoring the first unaffected core, the second unaffected core, and the third unaffected core perform the task in parallel in a majority mode; and wherein restarting the affected core includes, in response to detecting a safe restart time: loading the affected core with register data from the first unaffected core; and reinitializing the affected core.

In one aspect, in combination with any example computer readable storage device above or below, the corresponding plurality of cores are included on a shared System on a Chip with a supervisor configured to monitor the plurality of debug trace data streams.

In one aspect, in combination with any example computer readable storage device above or below, at least one core of the corresponding plurality of cores is included on a separate integrated circuit from other cores of the corresponding plurality of cores.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

The present disclosure provides for improved core synchronization in multi-core processor systems. The present disclosure uses real-time (or near real-time) information from each processing core (generally, cores) that is monitored from the debug trace in each processing core. These debug trace streams are often transported off-chip for review by an external debugger, but are used herein for comparing the output of one core against the outputs of other cores (whether on-chip or off-chip) for detecting if the cores are synchronized with one another. In various embodiments, when a core is found to be out of synchronization, the system continues operations with a reduced set of synchronized cores (e.g., initially operating with n cores, then operating with n−1 cores, and potentially adjusting a redundancy mode) until the system is in a safe environment or state to perform a core reset. Additionally or alternatively, a core that is out of lockstep is brought back into lockstep with the other cores using the state information from the in-lockstep cores. Accordingly, the present disclosure reduces the number of cores that are restarted and increases the speed at which the non-lockstep cores are brought back online.

Figure 1:
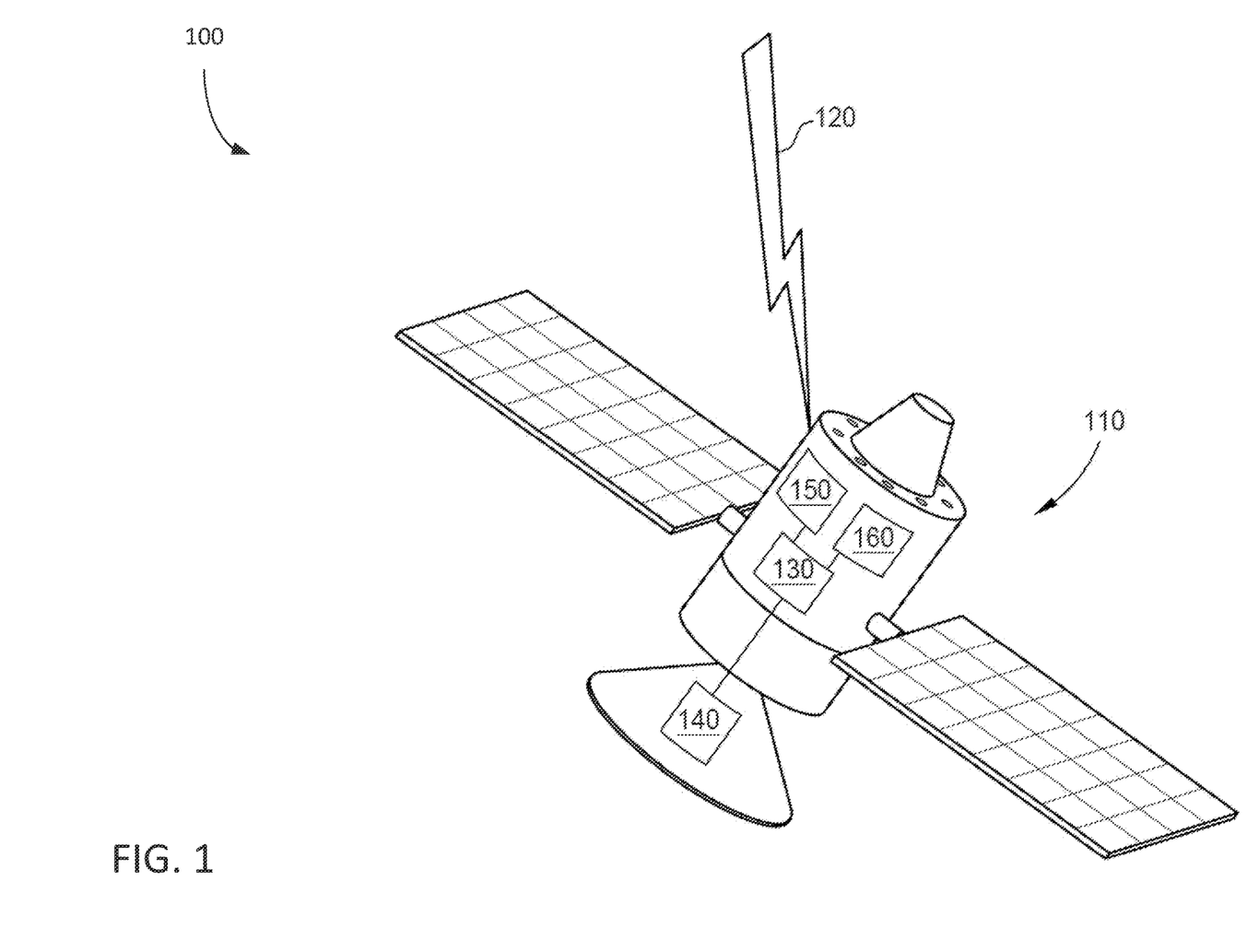
FIG. 1 illustrates a satellite as an example of a device including a multi-core control system, according to aspects of the present disclosure.

FIG. 1 illustrates a satellite 110 as an example of a redundantly operating system 100 including a multi-core control system 130, according to aspects of the present disclosure. A multi-core control system 130 uses several processors or processing cores (generally, cores) to perform several instances of a calculation or task in parallel with one another so that the consensus between the active cores is used to control the system 100, rather than the output of a single core. When the cores are not in lockstep, e.g., producing a non-unanimous value for the output, the core(s) that produced outputs different than the majority output are said to be out of lockstep or affected, and may continue producing different values as the affected cores are no longer synchronized with the other cores. The multi-core control system 130 deactivates, disables, or otherwise ignores the affected cores and the values produced thereby until those cores are brought back into lockstep with the other cores via a restart event. A restart event can include resetting one or more cores, or may include loading one or more cores with known good data and reinitializing the affected cores to use the same inputs at the same processing cycle as the unaffected cores.

The present disclosure may be practiced in any system or device using a multi-core control system 130 to provide processing resiliency in relation to SEUs, such as, for example, spacecraft, aircraft, x-ray devices, and other devices expected to be used in space, high altitude or other environments where ionizing radiation could change the state of a bit in a processor. These effects also occur in terrestrial applications, and are critical to address for high-reliability applications, such as autonomous vehicles. For example, the illustrated satellite 110 is being struck by a cosmic ray 120, which carries sufficient energy to induce a SEU in the cores of the satellite 110 (e.g., changing a logical Output A to a logical Output B or vice versa).

Because the satellite 110 includes a multi-core control system 130, rather than a single core control system, several cores operate in tandem to control the satellite 110 so that a SEU that causes one core to produce an aberrant result does not result in aberrant operations in the satellite 110. For example, the multi-core control system 130 may include n cores (where n>1) that each perform a calculation tasks in parallel so that the satellite 110 operates using an agreed-upon value for the calculation rather than merely an output of a single processor. Accordingly, when the cosmic ray 120 induces a SEU in the multi-core control system 130, the multi-core control system 130 identifies that a SEU has occurred, and takes appropriate remedial actions, including stopping an affected core, operating with a reduced core set, restarting an affected core, and combinations thereof.

The multi-core control system 130 may control various sub-systems of the system 100, illustrated as a communications system 140, a maneuvering system 150, and a solar panel management system 160 in the satellite 110 of FIG. 1. Depending on what tasks the multi-core control system 130 is processing at a given time, going offline (even briefly) to reset one or more processors affected by SEUs can affect various sub-systems in different ways, which in turn affect the operational safety of the system 100. For example, resetting the cores could disrupt communications to or from the satellite when the multi-core control system 130 is processing communications in conjunction with the communications system 140, which may require retransmitting (or requesting retransmission) of the data, loss of fidelity the data (e.g., a gap in the transmission), or the like while the multi-core control system 130 is offline. In another example, resetting the cores could disrupt the positioning and movements of the satellite 110 when the multi-core control system 130 is controlling the maneuvering system 150, expending limited fuel to undo an improperly performed maneuver, missing a maneuvering window, increasing collision risks, and the like. Accordingly, the multi-core control system 130 determines how and when to best handle an affected core to reduce the effect of having one fewer core available to handle processing tasks for the device and reduce the downtime required to restate the affected cores, thereby improving the uptime of the system 100.

The multi-core control system 130 can perform various restart events depending on the number of active/unaffected cores and whether the system 100 is in a safe time to restart. Accordingly, different subsystems may have different priorities for restarting versus continuing processing with a reduced set of cores.

For example, the maneuvering system 150 of the satellite 110 may be ranked as a high-priority sub-system, so that when the multi-core control system 130 is handling instructions or tasks for the maneuvering system 150 and experiences a SEU, restart events are delayed until after the tasks have been completed. In a contrasting example, the solar panel management system 160 of the satellite 110 may be ranked as a low-priority sub-system, so that when the multi-core control system 130 is handling instructions or tasks for the solar panel management system 160 and experiences a SEU, restart events are performed before the tasks have been completed. In another example, the communications system 140 may be ranked high-priority or low-priority depending on the data being transmitted, to thereby delay a restart event when handling high-priority transmissions or prioritize restarting when handling low-priority transmissions.

In some aspects, the multi-core control system 130 recognizes safe times to perform a restart of the affected cores based on tags indicated in the instructions processed by the cores. For examples, tags may indicate the end of a subroutine or function (e.g., a break in the task) that a restart event can be performed afterward without disrupting operations of the system 100. In another example, tags may indicate that a given subroutine or function expects a subsequent action within a predefined time window, or may be subject to interrupts from high-priority subsystems, and thus a restart even cannot be performed during or afterward without potentially disrupting operations of the system 100.

Figure 2A:
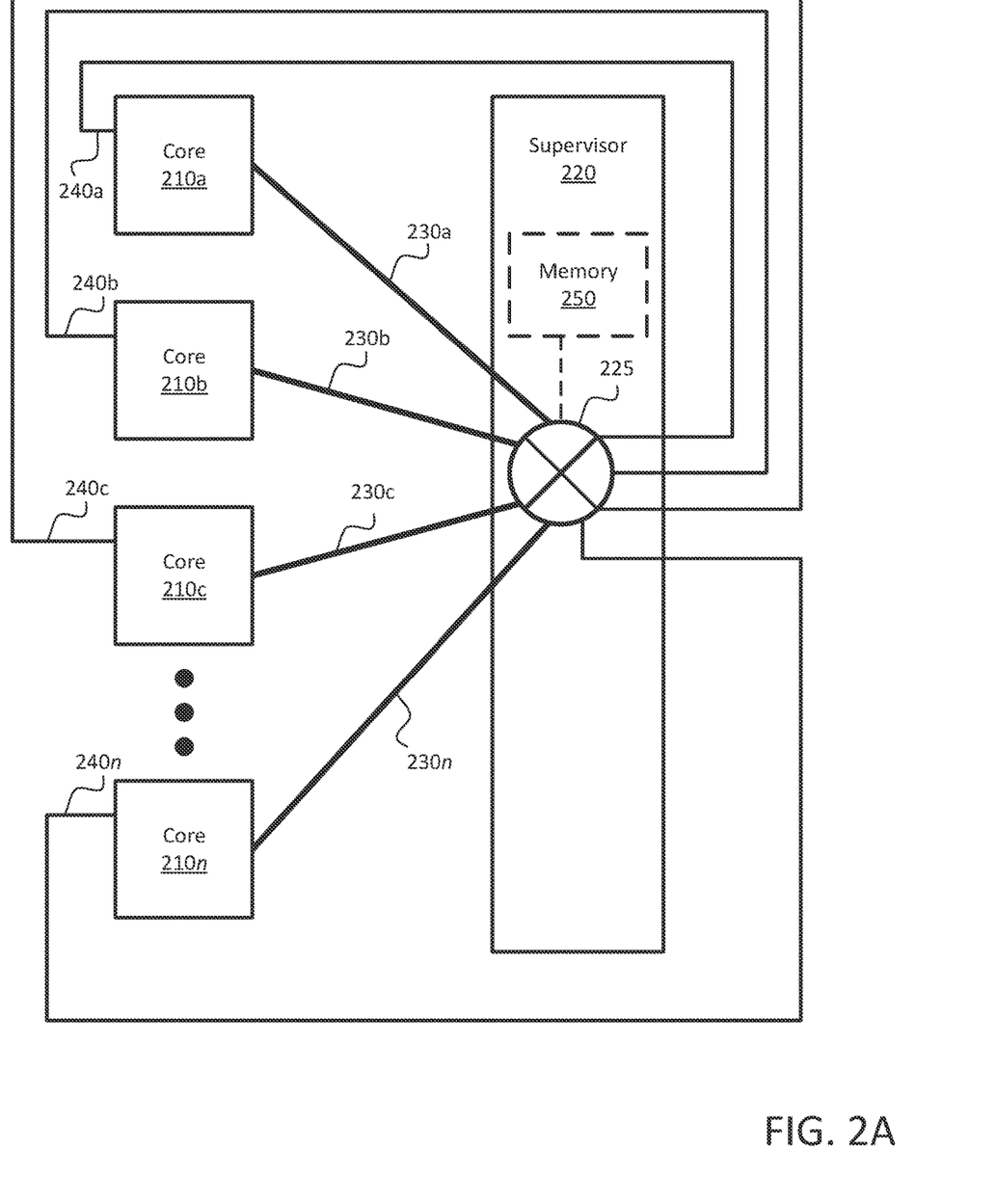
FIGS. 2A-2C illustrate operational diagrams for a multi-core control system, according to aspects of the present disclosure.
Figure 2B:
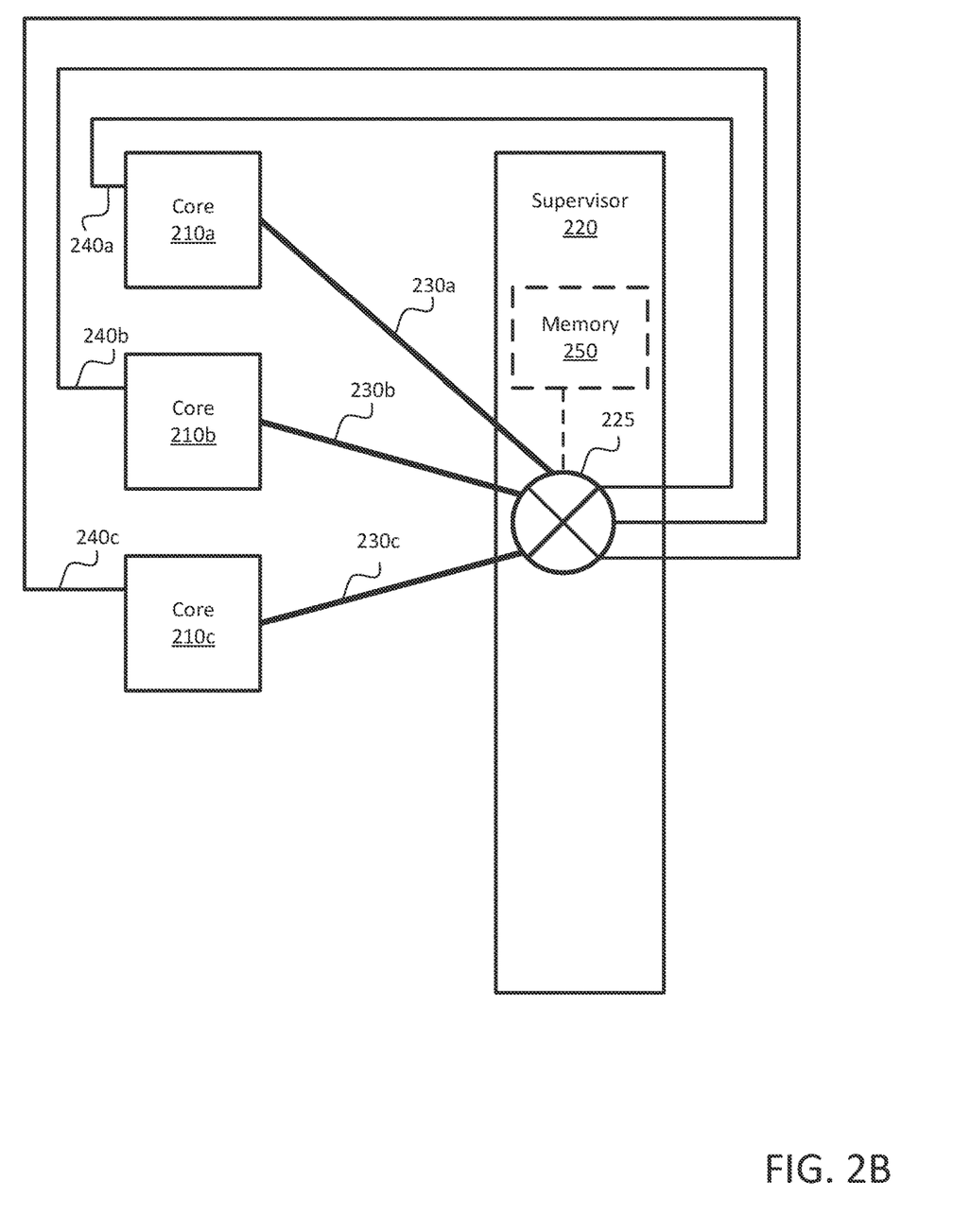
Figure 2C:
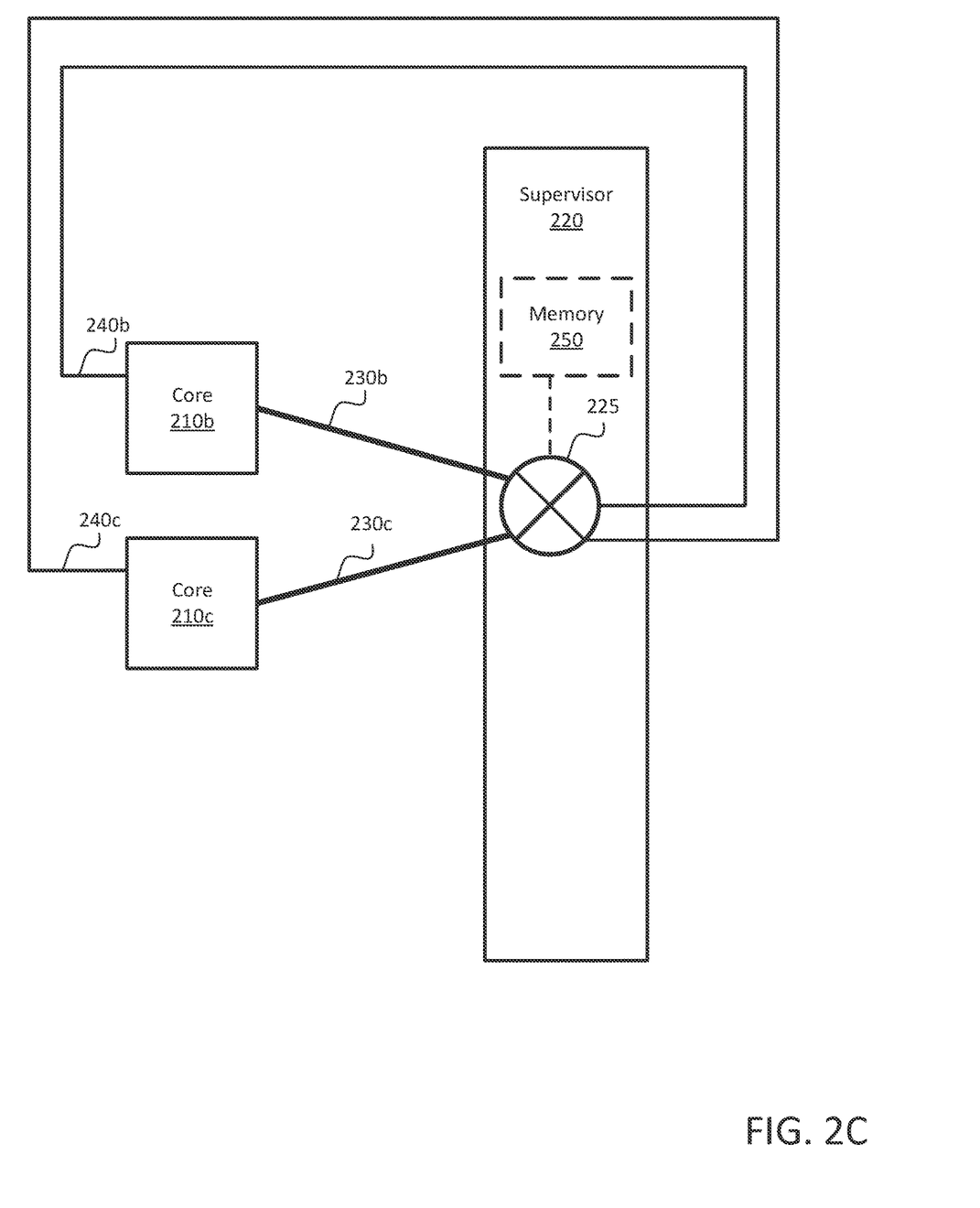

FIGS. 2A-2C illustrate operational diagrams for a multi-core control system 130, such as is described in FIG. 1, according to aspects of the present disclosure. In each of FIGS. 2A-2C, multiple cores 210*a-n* (generally or collectively, cores 210) are connected to a supervisor 220 by associated debug trace data streams 230*a-n* (generally or collectively, debug trace data or debug trace data streams 230). The supervisor 220, in turn, is connected to each of the cores 210 via an associated restart path 240*a-n* (generally or collectively, restart paths 240) to signal when a given core 210 is to be taken offline, reset, reinitialized, reloaded with data from another core 210, and combinations thereof. The cores 210 are representative of various processing devices, which can include embedded Reduced Instruction Set Core (RISC) cores or external devices in some aspects. The supervisor 220 is selected to be resilient to SEUs, and can include various radiation hardened processors, hardware-defined state machines, maintenance processors, or the like to monitor and control the various cores 210.

The supervisor 220 is in communication with each of the cores 210 via various debug trace streams 230, which can include instruction trace, data trace, system trace, address synchronization trace (ASYNC), instruction synchronization trace (ISYNC), and combinations thereof. ASYNC and ISYNC include patterns and data that are separately encoded into the trace data stream, and may optionally include time stamp data.

The supervisor 220 receives data output from the cores 210 via the debug trace data streams 230, and sends commands to the various cores 210 via the associated restart paths 240 (controlling stop and restart of the associated cores 210). In various aspects, the cores 210 and the supervisor 220 are located on a shared integrated circuit or System on a Chip (SoC), and the debug trace data streams 230 and restart paths 240 include various traces defined on that integrated circuit. In other aspects, one or more cores 210 are defined on a different integrated circuit than the other cores 210 or the supervisor 220, and the debug trace data streams 230 and restart paths 240 include communication pathways and busses between the different integrated circuits.

In various aspects, the supervisor 220 optionally includes a memory 250 where the status of the connected cores 210 is stored and used to manage how the comparator 225 operates as the number of active cores 210 changes during operation. In some aspects, the memory 250 includes TMR registers, flip-flops, or latches to capture the current state of a state machine, which can also be used as the program and data storage of a small processor. In other aspects, the memory 250 used by the supervisor 220 uses robust error-correcting coding (ECC) (i.e., ECC-memory).

Depending on the number of active cores 210 that the supervisor 220 is monitoring, the supervisor 220 configures a comparator 225 for different comparison modes.

FIG. 2A illustrates a plurality of cores 210 with active cores 210a-n providing corresponding inputs for comparison to the supervisor 220. The supervisor 220 configures the comparator 225 for majority mode comparisons so that when disagreement occurs in the value output from the cores 210 via the debug trace data streams 230, the supervisor 220 uses a first value provided by a first group of cores 210 and disables a second group of cores 210 that provide a second value, where the second group has fewer members than the first group. For example, if the supervisor 220 monitors n cores 210, and at time $t_1$ x cores 210 return Output A and y cores return Output B, where x+y=n and x>y, the supervisor 220 uses Output A as the value to control the system and disables or ignores the y cores 210 that returned Output B from time $t_2$ onward until those cores 210 are restarted. In various aspects, when the number of active cores 210 is even in number, the supervisor 220 enables a deadlock handling routine for the comparator 225 to mark all of the cores 210 as affected when equal numbers of cores 210 return different values (i.e., n/2 return Output B and n/2 return Output A). For example, this condition could occur if only two cores 210 are operated in parallel to provide a technique to detect the disagreement and reset both processors and/or switch to another pair operating in parallel.

FIG. 2B illustrates a plurality of cores 210 with three active cores 210a-c providing inputs for comparison to the supervisor 220. In various aspects, the supervisor 220 monitors three active cores 210a-c after disabling additional cores 210 (e.g., monitoring n cores 210, where n>3 initially and n=3 currently). When monitoring three active cores 210, the supervisor 220 configures the comparator 225 for majority mode comparisons so that when disagreement occurs in the value output from the cores 210 via the debug trace data streams 230, the supervisor 220 uses a first value provided by two of cores 210 and disables the one core 210 that provide a second value. For example, if the supervisor 220 monitors three cores 210a-c, and at time $t_1$ a first core 210 returns Output A and the second core 210b and the third core 210c both return Output B, the supervisor 220 uses Output B as the value to control the system and disables or ignores the first core 210a from time $t_2$ onward until the first core 210a is restarted.

FIG. 2C illustrates a plurality of cores 210 with two active cores 210a-b providing inputs for comparison to the supervisor 220. In various aspects, the supervisor 220 monitors two active cores 210a-b after disabling a third core 210c (e.g., monitoring n cores 210, where n≥3 initially and n=2 currently). When monitoring two active cores 210, the supervisor 220 configures the comparator 225 for consensus mode comparisons so that when disagreement occurs in the value output from the cores 210 via the debug trace data streams 230, the supervisor 220 ignores both values, as neither core 210 can be confirmed as providing the "correct" output and proceeding with one core 210 would not provide any redundancy for future calculations. Accordingly, the supervisor 220 signals for both cores 210a-b to be restarted simultaneously when a state difference is detected between the cores 210a-b before continuing to perform tasks to control the system.

Figure 3:
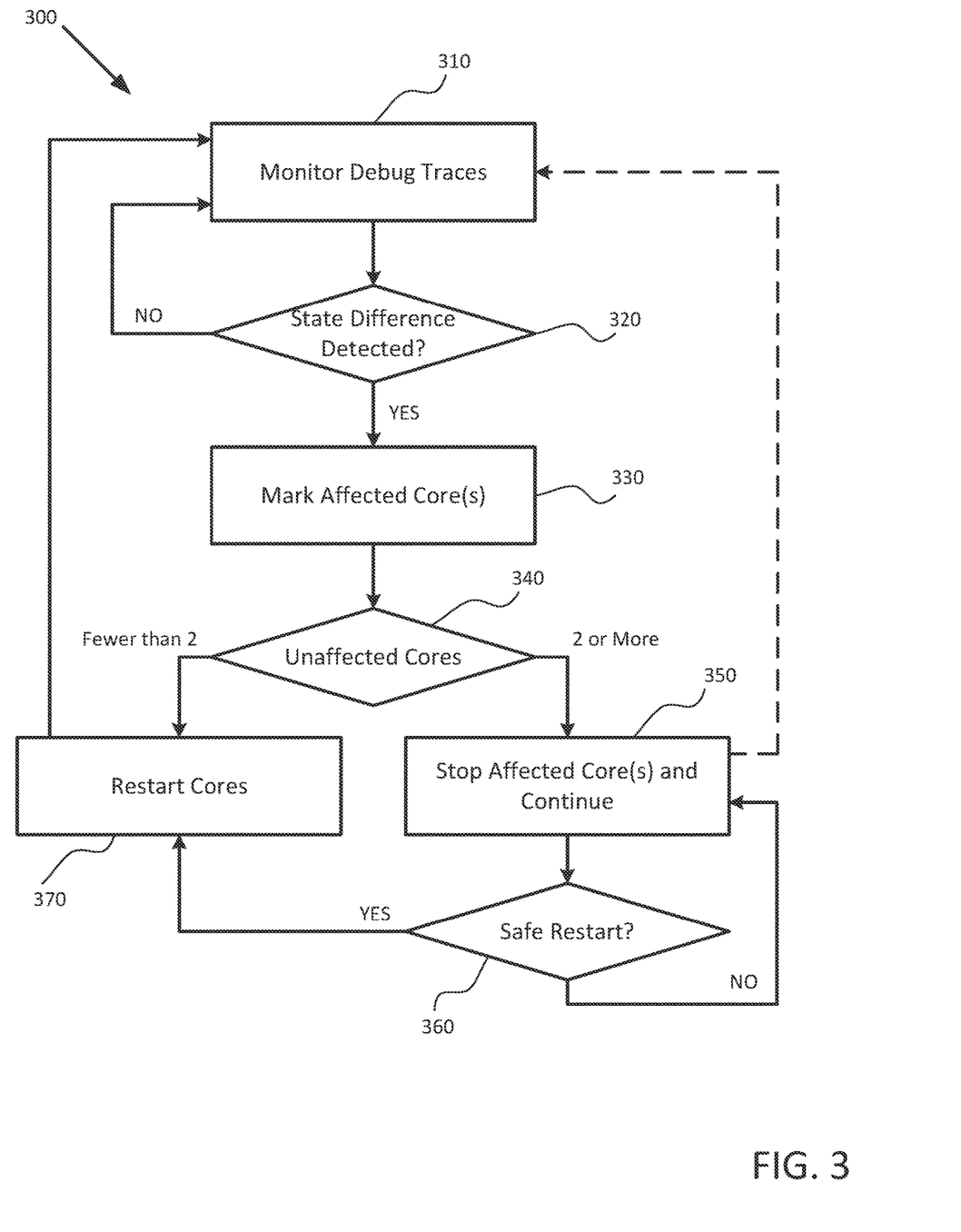
FIG. 3 is a flowchart of a method for using debug trace streams for core synchronization, according to aspects of the present disclosure.

FIG. 3 is a flowchart of a method 300 for using debug trace streams for core synchronization, according to aspects of the present disclosure. Method 300 begins with block 310, where the supervisor 220 monitors a plurality of debug trace data streams 230 for a system including a plurality of cores 210 performing a task in parallel for redundancy. The supervisor 220 ensures that the debug trace streams from different cores 210 are temporally aligned with one another so that (nominally) equivalent outputs are compared against one another despite slight differences in time of arrival at the comparator 225. In one example, the supervisor 220 monitors the logical values produced by the associated cores 210 in the same clock cycle to identify when one core 210 has produced a logical value that does match the output logic values from the other cores 210. In other examples, when the cores 210 operate on different integrated circuits or otherwise produce outputs asynchronously, the supervisor 220 may buffer the outputs to align the outputs for comparison against one another. In another example, when the debug trace streams include time stamps, the supervisor 220 ensures that data values associated with the same time stamp are compared against one another.

In various aspects, the supervisor 220 may selectively deactivate or otherwise ignore values reported from cores 210 that have previously been identified as affected by an SEU or otherwise producing logical values that do not match the output of the other cores 210. Accordingly, the supervisor 220 monitors the active cores 210 that have been confirmed to produce matching outputs to one another. Any cores 210 marked as affected may be ignored until restarted and brought back into lockstep with the other cores 210.

At block 320, a comparator 225 in the supervisor 220 compares the values carried on each debug trace stream 230 to identify whether any of the active cores 210 are producing values for the same clock cycle that are different from one another. In response to detecting a state difference on one debug trace stream 230 relative to the other debug trace data streams 230, method 300 proceeds to block 330. Otherwise, when the state values carried by each of the debug trace data streams 230 are equal (i.e., a state difference does not exist), method 300 returns to block 310 to continue monitoring the debug trace data streams 230.

At block 330, the supervisor marks the core 210 that produced the output that does not match the outputs of the other cores 210 as being an affected core 210 that the system 100 can no longer rely on to provide redundant calculations with the rest of the cores 210. In various aspects, one or more cores 210 may be marked as an affected core 210 at the same time or over a period of time before being restarted. For example, when operating two cores 210 in a consensus mode, where the output of both cores 210a-b must match to be used by the system, when the first core 210a is noted as being out of lockstep with the second core 210b, both the first core 210a and the second core 210b are marked as being affected. Similarly, when operating five cores 210, when the output of a first core 210a and the second core 210b do not match the outputs of the other three cores 210 (which match each other), both the first core 210a and the second core 210b are marked as being affected.

In another example, when operating n cores 210, a first core 210a may be marked as an affected core at time $t_1$ and a second core 210b may be marked as an affected core 210 at time $t_2$. If a restart event occurred between times $t_1$ and $t_2$, the first core 210a is no longer marked as an affected core 210, but the second core 210b is marked as an affected core 210. Otherwise, if a restart event has not occurred between time $t_1$ and time $t_2$, both the first core 210a and the second cored 210b are marked as affected cores 210. Accordingly, the number of affected cores 210 may increase over time until a restart event occurs.

At block 340, the supervisor 220 determines how many unaffected cores 210 remain in the plurality of cores 210.

When fewer than two cores 210 remain unaffected, method 300 proceeds to block 370. Otherwise, when two or more cores 210 remain unaffected, method 300 proceeds to block 350.

At block 350, the supervisor 220 stops any affected cores 210 and continues monitoring the debug trace data streams 230 of the unaffected cores 210 (e.g., per block 310), thus reducing the number of cores 210 available for providing redundancy calculation, but ensuring that the remaining cores 210 are in lockstep.

Depending on the number of unaffected cores 210 remaining in the plurality of cores 210 to provide redundancy for the calculations, the supervisor 220 may alter the redundancy mode used by the comparator 225. For example, when the plurality of cores 210 is reduced from three active cores 210 to two active cores 210 (e.g., a first core 210a is affected and is stopped, whereas a second core 210b and a third core 210c are unaffected and continue processing), the supervisor 220 switches the comparator 225 from a majority redundancy mode to a consensus redundancy mode. In another example, when the plurality of cores 210 is reduced from four or more active cores 210 to at least three active cores 210 (i.e., from n to n−1 cores 210, where n≥4), the supervisor 220 maintains the comparator 225 in a majority redundancy mode. Additionally, when the number of active cores 210 changes from an odd number to an even number in redundancy mode or vice versa, the supervisor 220 may enable or disable a deadlock handling routine to mark all of the cores 210 as affected when an equal number of cores 210 return a first result as return a second result (i.e., n/2 return Output B and n/2 return Output A).

At block 360, the supervisor 220 determines whether the system has reached a safe restart time. In various aspects, the system 100 controlled by the cores 210 may provide a safety profile to indicate when the system 100 is in a condition that is safe to temporarily suspend processing to allow for the time to restart one or more cores 210. For example, a satellite 110 (as in FIG. 1) may indicate that a restart event is safe when the satellite 110 is not performing a maneuver (e.g., to adjust an orbit or avoid debris) or receiving commands from a ground controller. Accordingly, when the satellite 110 has the option to continue processing with a reduced set of cores 210 (e.g., with at least one affected core 210 disabled or removed from the plurality of cores 210), the supervisor 220 waits to restart the affected cores 210 until the satellite 110 reaches a safe restart time (also referred to as a safe reset time). In various aspects, the safe restart times are indicated by tags in the processes performed by the cores 210 that set a safe-reset bit in the supervisor 220 to Output A or Output B indicating whether the system is in a safe restart time.

In response to determining that the system 100 is not in a safe restart time, method 300 returns to block 350 to continue operating the system 100 with a reduced set of active cores 210. However, in response to determining that the system 100 has reached or is in a safe restart time, method 300 proceeds to block 370 to restart one or more cores 210.

At block 370, the supervisor 220 restarts the affected cores 210. In various aspects, the supervisor 220 resets the unaffected cores 210 in addition to the affected cores 210 to being all of the cores 210 into lockstep from a fresh start (e.g., clearing the respective registers and starting all cores 210 at the same instruction). In other aspects, the supervisor 220 reloads the registers of the affected cores 210 with data from the registers of the unaffected cores 210 (i.e., "good" register data), and reinitializes the affected cores 210 to be in lockstep with the unaffected cores 210.

Another option for restarting the affected cores 210, if the cores 210 are on separate integrated circuits or in separate power domains, is to power-cycle the affected core(s) 210. A power-cycle restart can be particularly useful in cases where the integrated circuit is susceptible to latch-up and a power cycle that powers down and then powers up the given core can correct the latch-up before a hard failure occurs. A latch-up condition detection can be assumed in cases where devices are not hardened for that possibility or the trace stream mis-compare can be used in conjunction with a current measurement of that device. Alternately a power-cycle reset may be the system designers choice over resetting or stopping an affected core.

Restarting the affected cores 210 by reloading and reinitializing the affected cores 210 allows the unaffected cores 210 to remain active, and brings the affected cores 210 back into agreement with the unaffected cores 210. Once restarted, the supervisor 220 marks the affected cores 210 as unaffected (e.g., removing the affected status) and reconfigures the comparator 225 to monitor the debug trace data streams 230 from all of the cores 210. In various aspects, the supervisor 220 resets the redundancy mode for comparing the cores 210 from a consensus mode (e.g., for two active cores 210) to a majority mode (e.g., for three or more cores 210).

As used herein, stopping a core 210 can mean stopping instruction execution on that core 210 via a wait instruction, via a hardware breakpoint or hardware trigger, applying reset, power on reset, software reset, or holding the core 210 in the reset state. As used herein, restarting a core 210 can mean removing the halting condition by restoring power, deactivating reset, removing a hardware condition that holds the core 210 in a halted state, overriding a software wait, or overriding a halt instruction. As used herein, reinitializing a core 210 can mean restoring the registers and/or exclusive memory of the core 210 via the debug infrastructure, verifying that the registers and/or memory are intact (soft error) using the debug infrastructure, or using a reset process including bootstrap software to restore a core 210 to a known state. The debug infrastructure can include any available hardware path provided to the cores 210 to external hardware, such as, for example, a JTAG (Joint Test Action Group) or memory mapped data bus to the debug mechanisms.

After the supervisor 220 restarts the core(s) 210, method 300 returns to block 310 to continue monitoring the debug trace data streams 230, with the now-restored full set of available cores 210.

Figure 4:
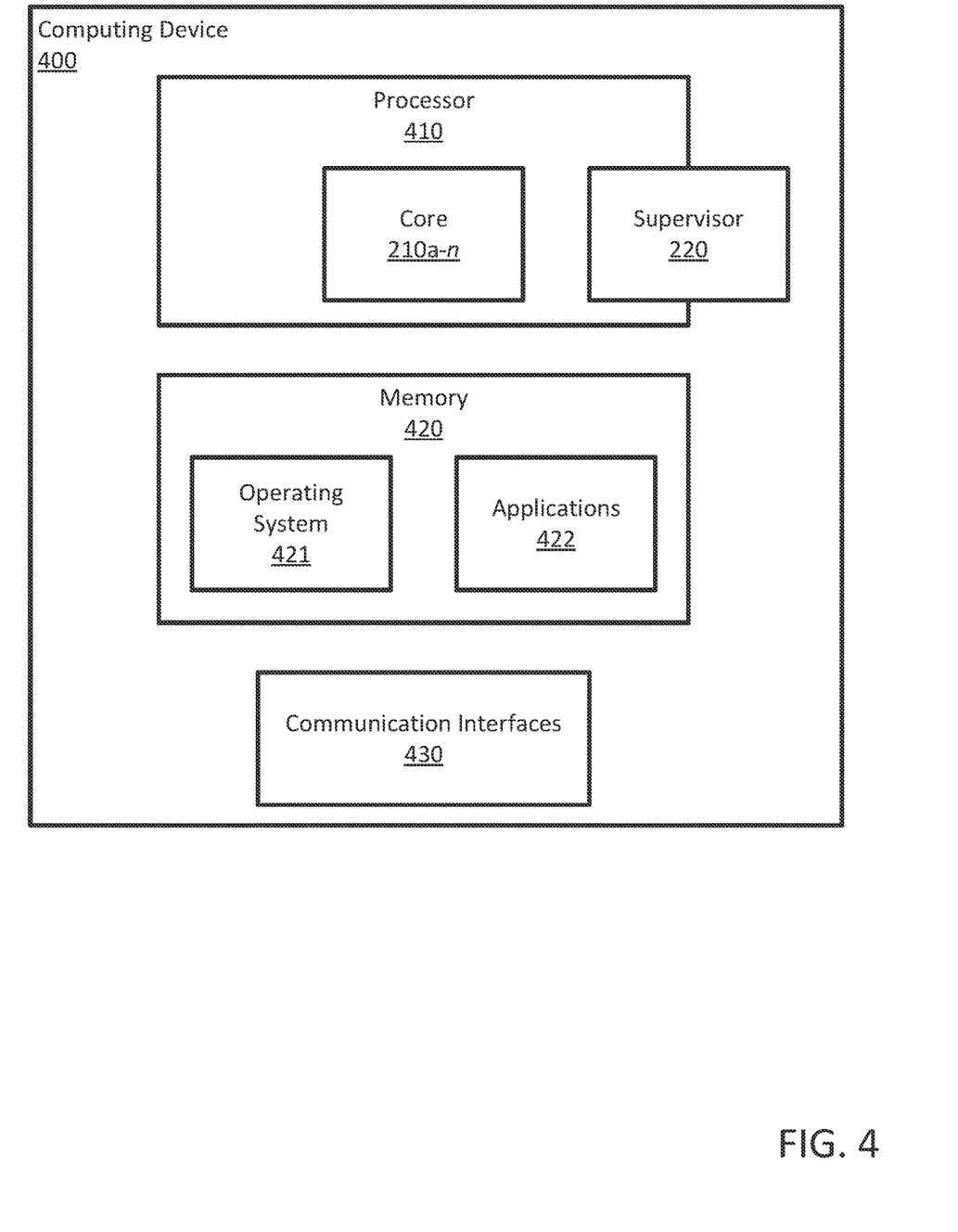
FIG. 4 illustrates a computing device, such as may be used as a multi-core control system, according to aspects of the present disclosure.

FIG. 4 illustrates a computing device 400, such as may be used as a multi-core control system 130, according to aspects of the present disclosure. The computing device 400 includes a processor 410 that includes multiple cores 210a-n, a memory 420, and a communications interface 430. In various aspects, the supervisor 220 can be included with the processor 410 or as a separate element. The processor 410 and the memory 420 provide computing functionality to run various programs and/or operations for the respective computing device 400, including the storage and retrieval of the various data described herein.

The processor 410, which may be any computer processor capable of performing the functions described herein, executes commands based on inputs received from a user or sensor and the data received from the communication interface 430.

The memory 420 is a computer-readable memory storage device that generally includes various processor-executable instructions, that when executed by the processor 410, perform the various functions related the control of a system subject to potential SEUs as described herein (e.g., a satellite 110, a spacecraft, an aircraft, etc.). In various aspects, the memory 420 can be attached to individual processors 410 or cores 210, or may be a memory sub-system shared by several processors 410 or cores 210. The processor-executable instructions may generally be described or organized into various "applications" or "modules" in the memory 420, although alternate implementations may have different functions and/or combinations of functions. The memory 420 also generally includes data structures that store information for use by or output by the various applications or modules. In the present disclosure, the memory 420 includes at least instructions for an operating system 421, one or more application(s) 422. The memory 420 may include redundancy such as parity or error correction codes in various aspects so that a failure in an individual memory 420 used exclusively by an associated core 210 can be detected via the herein described trace comparisons in the event that the memory data is accessed by the associated core 210. The memory 420 may be one or more memory devices, such as, for example, Random Access Memory (RAM), Read Only Memory (ROM), flash memory, magnetic media, optical media, flexible data storage or any other type of volatile or non-volatile storage medium that includes instructions that the processor 410 may execute. As used herein, a memory storage device shall be understood to describe an apparatus and not a non-transitory signal.

The communication interface 430 connects the computing device 400 to external devices, such as, for example, external memory devices, external computing devices, a power source, a wireless transmitter, etc., and may include various connection ports (e.g., Universal Serial Bus (USB), Ethernet, SpaceWire, coaxial jacks) and cabling. The communication interface 430 is used to send and receive communications between computing devices 400.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, embedded software, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method, comprising:
    monitoring a plurality of debug trace data streams for a redundantly operating system including a corresponding plurality of cores performing a task in parallel, wherein a consensus of output values between the plurality of cores controls the redundantly operating system, wherein the plurality of cores are in lockstep when the output values are unanimous;
    in response to detecting a state difference on one debug trace data stream of the plurality of debug trace data streams relative to other debug trace data streams of the plurality of debug trace data streams:
        marking a given core associated with the one debug trace data stream as an affected core, wherein the affected core is ignored by the redundantly operating system until a restart of the affected core; and
        restarting the affected core, wherein the restarted core is returned to lockstep with the plurality of cores.

2. The method of claim 1, wherein the corresponding plurality of cores consists of two active cores, including the affected core and a second core, the method further comprising, in response to detecting the state difference:
    marking the second core as a second affected core; and
    resetting the second core simultaneously with the affected core.

3. The method of claim 1, wherein the corresponding plurality of cores consists of three active cores, including the affected core, a first unaffected core, and a second unaffected core, the method further comprising, in response to detecting the state difference:
    stopping the affected core; and
    monitoring the first unaffected core and the second unaffected core perform the task in parallel in a consensus redundancy mode; and
    wherein restarting the affected core includes, in response to detecting a safe restart time:
        loading the affected core with register data from the first unaffected core; and
        reinitializing the affected core.

4. The method of claim 1, wherein the corresponding plurality of cores includes more than three active cores, including the affected core, a first unaffected core, a second unaffected core, and a third unaffected core, in response to detecting the state difference:
    stopping the affected core; and
    monitoring the first unaffected core, the second unaffected core, and the third unaffected core perform the task in parallel in a majority mode; and
    wherein restarting the affected core includes, in response to detecting a safe restart time:
        reloading the affected core with register data from the first unaffected core; and
        reinitializing the affected core.

5. The method of claim 1, wherein the corresponding plurality of cores are included on a shared System on a Chip with a supervisor, wherein the supervisor is one of:
    a radiation hardened processor;
    a hardware-defined state machine; and
    a maintenance processor.

6. The method of claim 1, wherein at least one core of the corresponding plurality of cores is included on a separate integrated circuit from other cores of the corresponding plurality of cores.

7. A system, comprising:
    a plurality of cores configured to perform, in parallel, a corresponding plurality of instances of a task, wherein a consensus of output values between the plurality of cores controls the system, wherein the plurality of cores are in lockstep when the output values are unanimous; and
    a supervisor configured to:
        receive debug trace data streams from the plurality of cores;
        identify an affected core of the plurality of cores based on a state difference between the debug trace data streams associated with the affected core and other cores of the plurality of cores;
        ignore the affected core until a restart of the affected core; and
        restart the affected core, wherein the restarted core is returned to lockstep with the plurality of cores.

8. The system of claim 7, wherein the plurality of cores and the supervisor are disposed on a single integrated circuit.

9. The system of claim 7, wherein the supervisor is disposed on a first integrated circuit and at least one core of the plurality of cores is disposed on a second integrated circuit.

10. The system of claim 7, wherein the supervisor is further configured to:
    remove the affected core from the plurality of cores performing the task until a safe restart time; and
    in response to reaching the safe restart time, restart the affected core.

11. The system of claim 10, wherein when the plurality of cores includes at least two cores after removing the affected core, the supervisor is further configured to:
    reload affected registers associated with the affected core with data from unaffected registers associated with one unaffected core of the at least two cores;
    reinitialize the affected core; and
    return the affected core to the plurality of cores.

12. The system of claim 10, wherein the safe restart time is determined based on a safety profile of a device controlled by the system.

13. The system of claim 10, wherein when the plurality of cores consists of two cores, the supervisor is further configured to:
    reset a second core simultaneously with the affected core.

14. The system of claim 7, wherein the debug trace data streams are received via at least one of:

instruction trace;
data trace; and
system trace.

15. A non-transitory computer readable storage device including instructions that when executed by a processor perform an operation comprising:
monitoring a plurality of debug trace data streams for a redundantly operating system including a corresponding plurality of cores performing a task in parallel, wherein a consensus of output values between the plurality of cores controls the redundantly operating system, and wherein the plurality of cores are in lockstep when the output values are unanimous;
in response to detecting a state difference on one debug trace data stream of the plurality of debug trace data streams relative to other debug trace data stream of the plurality of debug trace data streams:
marking a core associated with the one debug trace data stream as an affected core, wherein the affected core is ignored by the redundantly operating system until a restart of the affected core; and
restarting the affected core, wherein the restarted core is returned to lockstep with the plurality of cores.

16. The computer readable storage device of claim 15, wherein the corresponding plurality of cores consists of two active cores, including the affected core and a second core, the operation further comprising, in response to detecting the state difference:
marking the second core as a second affected core; and
resetting the second core simultaneously with the affected core.

17. The computer readable storage device of claim 15, wherein the corresponding plurality of cores consists of three active cores, including the affected core, a first unaffected core, and a second unaffected core, the operation further comprising, in response to detecting the state difference:
stopping the affected core; and
monitoring the first unaffected core and the second unaffected core perform the task in parallel in a consensus redundancy mode; and
wherein restarting the affected core includes, in response to detecting a safe restart time:
loading the affected core with register data from the first unaffected core; and
reinitializing the affected core.

18. The computer readable storage device of claim 15, wherein the corresponding plurality of cores includes more than three active cores, including the affected core, a first unaffected core, a second unaffected core, and a third unaffected core, the operation further comprising, in response to detecting the state difference:
stopping the affected core; and
monitoring the first unaffected core, the second unaffected core, and the third unaffected core perform the task in parallel in a majority mode; and
wherein restarting the affected core includes, in response to detecting a safe restart time:
loading the affected core with register data from the first unaffected core; and
reinitializing the affected core.

19. The computer readable storage device of claim 15, wherein the corresponding plurality of cores are included on a shared System on a Chip with a supervisor configured to monitor the plurality of debug trace data streams.

20. The computer readable storage device of claim 15, wherein at least one core of the corresponding plurality of cores is included on a separate integrated circuit from other cores of the corresponding plurality of cores.

* * * * *